United States Patent
Chauvel et al.

(10) Patent No.: US 7,840,782 B2
(45) Date of Patent: Nov. 23, 2010

(54) MIXED STACK-BASED RISC PROCESSOR

(75) Inventors: Gerard Chauvel, Antibes (FR); Serge Lasserre, Frejus (FR); Dominique D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 1213 days.

(21) Appl. No.: 10/631,308

(22) Filed: Jul. 31, 2003

(65) Prior Publication Data

US 2004/0024989 A1 Feb. 5, 2004

Related U.S. Application Data

(60) Provisional application No. 60/400,391, filed on Jul. 31, 2002.

(30) Foreign Application Priority Data

Jul. 30, 2003 (EP) .................................. 03291916

(51) Int. Cl.
*G06F 9/30* (2006.01)
(52) U.S. Cl. ..................................... 712/202
(58) Field of Classification Search .................. 712/202
See application file for complete search history.

(56) References Cited

U.S. PATENT DOCUMENTS

| | | | |
|---|---|---|---|
| 6,079,010 A | 6/2000 | D'Arcy | |
| 6,088,786 A * | 7/2000 | Feierbach et al. | 712/200 |
| 6,098,089 A | 8/2000 | O'Connor et al. | 709/104 |
| 6,122,638 A * | 9/2000 | Huber et al. | 707/103 Y |
| 6,209,085 B1 * | 3/2001 | Hammond et al. | 712/244 |
| 6,256,725 B1 * | 7/2001 | Batten et al. | 712/200 |
| 6,330,659 B1 * | 12/2001 | Poff et al. | 712/34 |
| 6,374,286 B1 * | 4/2002 | Gee et al. | 718/108 |
| 6,397,379 B1 | 5/2002 | Yates, Jr. | |
| 6,473,777 B1 * | 10/2002 | Hendler et al. | 707/206 |
| 6,567,905 B2 | 5/2003 | Otis | 711/170 |

(Continued)

FOREIGN PATENT DOCUMENTS

WO    WO 0288859    1/2002

OTHER PUBLICATIONS

Hennessy, John, Patterson, David. "Computer Architecture: A Quantitative Approach." Morgan Kaufmann, May 17th, 2002. pp. 95-101.*

(Continued)

*Primary Examiner*—Eddie P Chan
*Assistant Examiner*—Jacob Petranek
(74) *Attorney, Agent, or Firm*—Ronald O. Neerings; Wade James Brady, III; Frederick J. Telecky, Jr.

(57) ABSTRACT

A processor (e.g., a co-processor) executes a stack-based instruction set and another instruction in a way that accelerates the execution of the stack-based instruction set, although code acceleration is not required under the scope of this disclosure. In accordance with at least some embodiments of the invention, the processor may comprise a multi-entry stack usable in at least a stack-based instruction set, logic coupled to and managing the stack, and a plurality of registers coupled to the logic and addressable through a second instruction set that provides register-based and memory-based operations.

38 Claims, 5 Drawing Sheets

U.S. PATENT DOCUMENTS

| | | | | |
|---|---|---|---|---|
| 6,571,260 | B1 | 5/2003 | Morris | 707/206 |
| 6,775,763 | B2 * | 8/2004 | Sexton et al. | 712/227 |
| 6,826,749 | B2 * | 11/2004 | Patel et al. | 717/148 |
| 6,839,831 | B2 * | 1/2005 | Balmer et al. | 712/218 |
| 6,901,503 | B2 * | 5/2005 | Barlow et al. | 712/210 |
| 6,928,539 | B2 * | 8/2005 | Brassac et al. | 713/1 |
| 6,961,843 | B2 * | 11/2005 | O'Connor et al. | 712/208 |
| 6,965,984 | B2 * | 11/2005 | Seal et al. | 712/209 |
| 2002/0065990 | A1 | 5/2002 | Chauvel et al. | 711/137 |
| 2002/0069332 | A1 | 6/2002 | Chauvel et al. | 711/144 |
| 2003/0101320 | A1 | 5/2003 | Chauvel et al. | 711/154 |

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

"PicoJava: A Direct Execution Engine for Java Bytecode" Computer, H. McGhan, et al., IEEE Service Center, Los Alamitos, CA, US, vol. 31, No. 10, Oct. 1998, pp. 22-30, XP000859744, ISSN: 0018-9162.

"A Crowd of Little Man Computers: Visual Computer Simulator Teaching Tools", W. Yurcik, et al., Institute of Electrical & Electronics Engineers, Proceedings of the 2001 Winter Simulation Conf., New York, IEEE vol. 1 of 2, Conf. 34, Dec. 9, 2001, pp. 1632-1639, XP010573734, ISBN: 0-7803-7307-3.

* cited by examiner

| R0 | GENERAL PURPOSE (GP) |
|---|---|
| R1 | GENERAL PURPOSE (GP) |
| R2 | GENERAL PURPOSE (GP) |
| R3 | GENERAL PURPOSE (GP) |
| R4 | PROGRAM COUNTER (PC) |
| R5 | GENERAL PURPOSE / LOCAL VARIABLE POINTER (LV) |
| R6 | STACK POINTER (SP) |
| R7 | TOP OF STACK (ToS) |
| R8 | GENERAL PURPOSE / ADDRESS INDEX 0 (AI0) |
| R9 | GENERAL PURPOSE / ADDRESS INDEX 1 (AI1) |
| R10 | GENERAL PURPOSE (GP) |
| R11 | GENERAL PURPOSE (GP) |
| R12 | MICRO-PROGRAM COUNTER (MICRO-PC) |
| R13 | GENERAL PURPOSE (GP) |
| R14 | GENERAL PURPOSE / INDIRECT REGISTER INDEX (IRI) |
| R15 | STATUS AND CONTROL (ST) |

*FIG. 3*

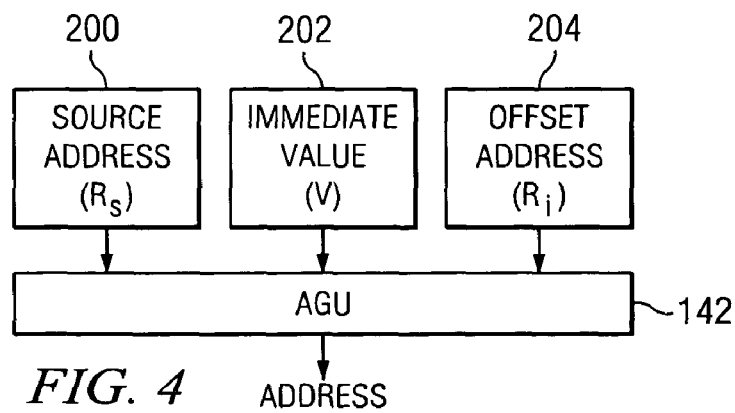

*FIG. 4*

CONDITIONAL CONTROL

ARRAY PROCESSING

LOAD/ STORE

I/O ACCESS

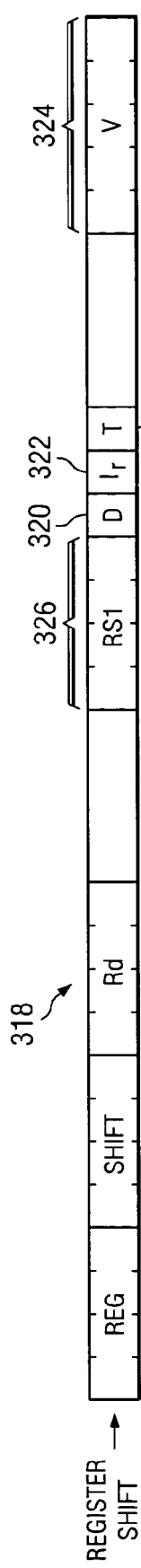
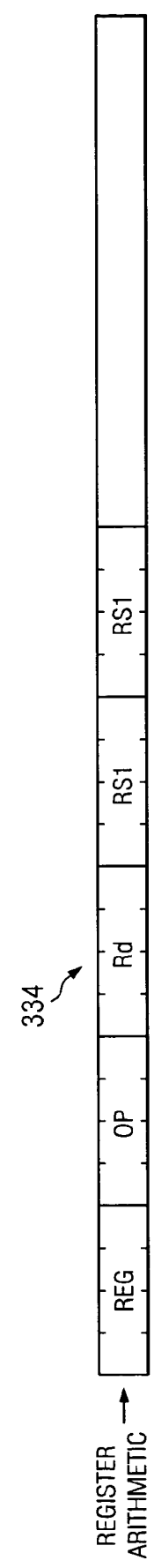
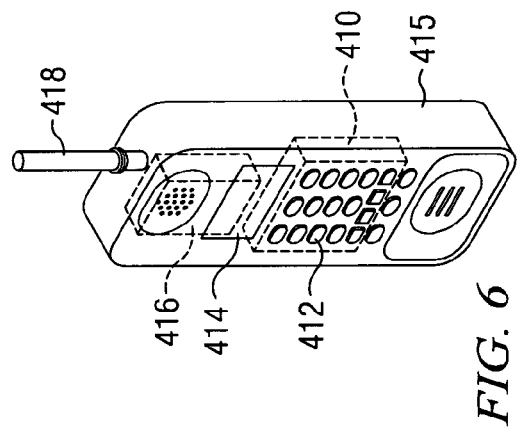
FIG. 5K
FIG. 5L
FIG. 6

MIXED STACK-BASED RISC PROCESSOR

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291916.9, filed Jul. 30, 2003 and entitled "A Multi-Processor Computing System Having A Java Stack Machine And A RISC-Based Processor," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003, Memory Management Of Local Variables, Ser. No. 10/632,067, filed Jul. 31 2003, "Memory Management Of Local Variables Upon A Change Of Context," Ser. No. 10/632,076, filed Jul. 31, 2003, "A Processor With A Split Stack," Ser. No. 10/632,079, filed July 31, 2003, ""Using IMPDEP2 For System Commands Related To Java Accelerator Hardware," Ser. No. 10/632,069, filed Jul. 31, 2003, "Test With Immediate And Skip Processor Instruction," Ser. No, 10/632,214, filed Jul. 31, 2003, Test And Skip Processor Instruction Having At Least One Register Operand," Ser. No. 10/632,084, filed Jul. 31, 2003, "Synchronizing Stack Storage," Ser. No. 10/631,422, filed Jul. 31, 2003, "Methods And Apparatuses For Managing Memory, "Ser. No. 10/631,252, filed Jul. 31, 2003, "Write Back Policy For Memory," Ser. No, 10/631,185, filed Jul. 31, 2003, "Methods And Apparatuses For Managing Memory,"Ser. No. 10/631,205, filed July 31, 2003, "Mixed Stack-Based RISC Processor," Ser. No. 10/631,308, filed July 31, 2003, "Processor That Accommodates Multiple Instruction Sets And Multiple Decode Modes," Ser. No. 10/631,246, filed Jul. 31, 2003, "System To Dispatch Several Instructions On Available Hardware Resources," Ser. No. 10/631,585, filed July 31, 2003, "Micro-Sequence Execution In A Processor," Ser. No. 10/632,216, filed Jul. 31, 2003, "Program Counter Adjustment Based On The Detection Of An Instruction Prefix," Ser. No. 10/632,222, filed Jul. 31, 2003, "Reformat Logic To Translate Between A Virtual Address And A Compressed Physical Address," Ser. No, 10/632,215, filed Jul. 31, 2003, "Synchronization Of Processor States," Ser. No. 10/632,024, filed Jul. 31, 2003, "Conditional Garbage Based On Monitoring To Improve Real Time Performance," Ser. No. 10/631, 195, filed Jul. 31, 2003, "Inter-Processor Control," Ser. No. 10/631,120, filed Jul. 31, 2003, "Cache Coherency In A Multi-Processor System," Ser. No, 10/632,229, filed Jul. 31, 2003, and "Concurrent Task Execution In A Multi-Processor, Single Operating System Environment," Ser. No. 10/632,077, filed Jul. 31, 2003.

BACKGROUND OF THE INVENTION

1. Technical Field of the Invention

The present invention relates generally to processors and more particularly to a processor capable of executing a stack-based instruction set and a non-stack based instruction set.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and requires as little memory as possible. Improvements in this area are desirable.

BRIEF SUMMARY

As disclosed herein, a processor (e.g., a co-processor) executes a stack-based instruction set and another instruction set in a way that accelerates the execution of the stack-based instruction set, although code acceleration is not required under the scope of this disclosure. In accordance with at least some embodiments of the invention, the processor may comprise a multi-entry stack usable in at least a stack-based instruction set, logic coupled to and managing the stack, and a plurality of registers coupled to the logic and addressable through a second instruction set that provides register-based and memory-based operations.

Other embodiments may include a system (e.g., a cellular telephone) that includes a main processor unit coupled to a co-processor. The co-processor may be configured to execute stack-based instructions from a first instruction set and instructions from a second instruction set that provides memory-based and register-based operations.

The processor described herein may include a multi-entry stack and registers at least some of which store the address of the top of the stack and the data value at the top of the stack. This multi-entry stack is generally fabricated in the core of the processor and represents the top n (e.g., eight) entries of a larger stack implemented in memory. These and other features are described herein.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 3 shows various registers used in the JSM of FIGS. 1 and 2;

FIG. 4 shows an embodiment useful to illustrate various addressing modes in accordance with the preferred embodiments;

FIGS. 5A-L show exemplary formats of various instructions executed by the JSM of FIGS. 1 and 2; and FIG. 6 depicts an exemplary embodiment of the system described herein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device such as a processor. The processor described herein is particularly suited for executing Java™ Bytecodes or comparable, code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims which follow. The processor described herein may be used in a wide variety of electronic systems. By way of example and without limitation, the Java-executing processor described herein may be used in a portable, battery-operated cell phone. Further, the processor advantageously includes one or more features that permit the execution of the Java code to be accelerated.

Figure 1:
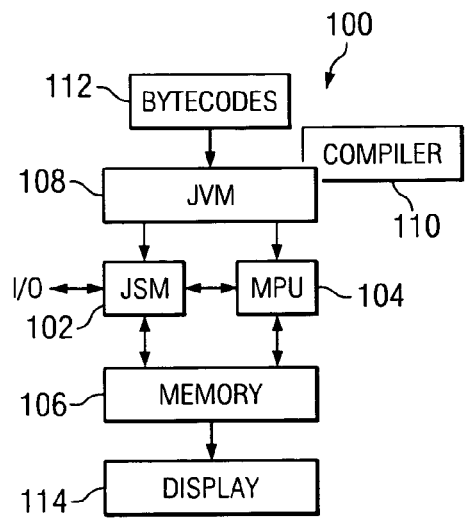
FIG. 1 shows a diagram of a system in accordance with preferred embodiments of the invention and including a Java Stack Machine ("JSM") and a Main Processor Unit ("MPU")

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. As noted above, while system 100 may be representative of, or adapted to, a wide variety of electronic systems, an exemplary electronic system may comprise a battery-operated, mobile cell phone.

As is generally well known, Java code comprises a plurality of "bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java bytecodes. When appropriate, however, the JSM 102 may request the MPU 104 to execute one or more Java bytecodes not executed or executable by the JSM 102. In addition to executing Java bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

In accordance with preferred embodiments of the invention, the JSM 102 may execute at least two instruction sets. One instruction set may comprise standard Java bytecodes. As is well-known, Java is a stack-based programming language in which instructions generally target a stack. For example, an integer add ("IADD") Java instruction pops two integers off the top of the stack, adds them together, and pushes the sum back on the stack. As will be explained in more detail below, the JSM 102 comprises a stack-based architecture with various features that accelerate the execution of stack-based Java code.

Another instruction set executed by the JSM 102 may include instructions other than standard Java instructions. In accordance with at least some embodiments of the invention, such other instruction set may include register-based and memory-based operations to be performed. This other instruction set generally complements the Java instruction set and, accordingly, may be referred to as a complementary instruction set architecture ("C-ISA"). By complementary, it is meant that the execution of more complex Java Bytecodes may be substituted by a "micro-sequence" comprising one or more C-ISA instructions that permit address calculation to readily "walk through" the JVM data structures. A micro-sequence also may include one or more Bytecode instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java bytecodes combined with a register-based architecture for executing register and memory based C-ISA instructions. Both architectures preferably are tightly combined and integrated through the C-ISA.

Figure 2:
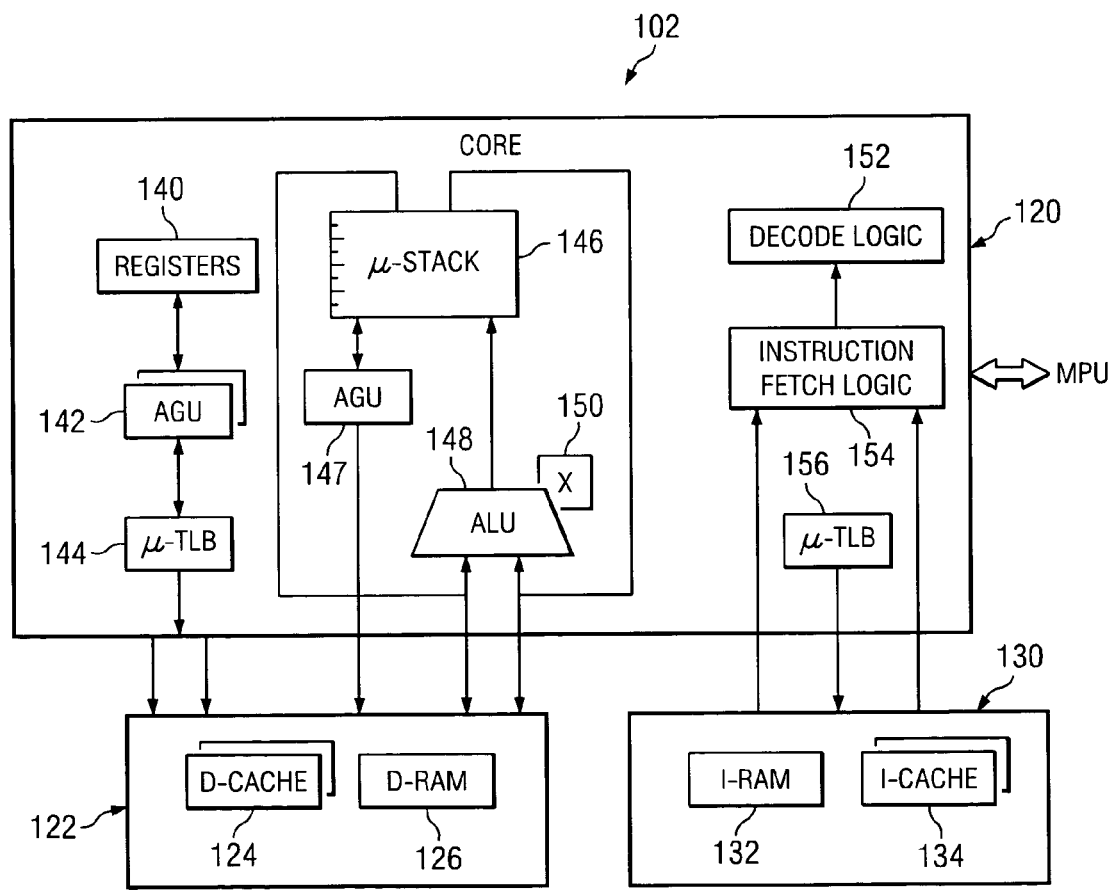
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146, processed by the ALU 148, while instructions may be fetched from instruction storage 130 by fetch logic 154 and decoded by decode logic 152. The address generation unit 142 may be used to calculate addresses based, at least in part on data contained in the registers 140. The AGUs 142 may calculate addresses for C-ISA instructions as will be described below. The AGUs 142 may support parallel data accesses for C-ISA instructions that perform array or other types of processing. AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104.

Referring now to FIG. 3, the registers 140 may include 16 registers designated as R0-R15. Registers R0-R3, R5, R8-R11 and R13-R14 may be used as general purposes ("GP") registers usable for any purpose by the programmer. Other registers, and some of the GP registers, may be used for specific functions. For example, registers R4 and R12 may be used to store two program counters. Register R4 preferably is used to store the program counter ("PC") and register R12 preferably is used to store a micro-program counter ("micro-PC"). In addition to use as a GP register, register R5 may be used to store the base address of a portion of memory in which Java local variables may be stored when used by the current Java method. The top of the micro-stack 146 is reflected in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"), as will be explained below. Register R14 may also be used to hold the indirect register index ("IRI") as will also be explained below. Register R15 may be used for status and control of the JSM 102. As an example, one status/control bit (called the "Micro-Sequence-Active" bit) may indicate if the JSM 102 is executing a "simple" instruction or a "complex" instruction through a "micro-sequence." This bit controls in particular, which program counter is used R4 (PC) or R12 (micro-PC) to fetch the next instruction. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structure for various verifications (e.g., NULL pointer, array boundaries). Because these data structure are generally JVM-dependent and thus may change from one JVM implementation to another, the software flexibility of the micro-sequence provides a mechanism for various JVM optimizations now known or later developed.

Referring again to FIG. 2, as noted above, the JSM 102 is adapted to process and execute instructions from at least two instruction sets. One instruction set includes stack-based operations and the second instruction set includes register-based and memory-based operations. The stack-based instruction set may include Java bytecodes. Java bytecodes pop, unless empty, data from and push data onto the micro-stack 146. The micro-stack 146 preferably comprises the top n entries of a larger stack that is implemented in data storage 122. Although the value of n may be vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The second, register-based, memory-based instruction set may comprise the C-ISA instruction set introduced above. The C-ISA instruction set preferably is complementary to the Java bytecode instruction set in that the C-ISA instructions may be used to accelerate or otherwise enhance the execution of Java bytecodes.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("D-RAMset") 126. Reference may be made to copending applications U.S. Ser. Nos. 09/591,537 filed Jun. 9, 2000, 09/591,656 filed Jun. 9, 2000, and Ser. No. 09/932,794 filed Aug. 17, 2001, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAMset 132 may be used for "complex" micro-sequenced Bytecodes or micro-sequences or predetermined sequences of code, as will be described below. The I-cache 134 may be used to store other types of Java bytecode and mixed Java/C-ISA instructions.

As noted above, the C-ISA instructions generally complement the standard Java bytecodes. For example, the compiler 110 may scan a series of Java bytes codes 112 and replace one or more of such bytecodes with an optimized code segment mixing C-ISA and bytecodes and which is capable of more efficiently performing the function(s) performed by the initial group of Java bytecodes. In at least this way, Java execution may be accelerated by the JSM 102.

As explained above, the C-ISA instruction set preferably permits register-based and memory-based operations. Memory-based operations generally require the calculation of an address in memory for the operand or the result. The AGUs 142 are used to calculate such memory references. Referring briefly to FIG. 4, one or more values may be provided to an AGU 142. Such values may include any, or all, of a source address 200, an immediate value 202, and an offset address 204. Such values may be included in, or otherwise specified by, a C-ISA instruction. These values also may be implicit or explicit within the Java bytecodes. For example, "Iload_1" may generate an address from the base address of the local variable area present in register R5 plus one to access the local variable 1 within the D_RAMset. The "iload" <index> may generate an address from the base address of the local variable area present in register R5 plus the value of the "index" operand. Further, the JSM 102 preferably is capable of multiple addressing modes as explained below.

FIGS. 5A-5L provide formats for various embodiments of C-ISA instructions. FIGS. 5A-5H show 16 bit formats, while FIGS. 5I-L show 32 bit formats. FIGS. 5A-5E generally include the same format which comprises an opcode field 230, an operand field 232 and an immediate value field 234. The number of bits in each field may be varied, but in accordance with the preferred embodiment, the opcode field 230 comprises four bits, the operand field 232 comprises four bits and the immediate value field 234 comprises eight bits.

With four bits, the opcode field 230 may encode up to 16 different, 16-bit instructions or groups of instructions. In particular, some of the four bit values may be used to extend the size of the instruction to 32-bits. Referring still to FIGS. 5A-5E, the immediate field 234 preferably comprises a seven-bit immediate value V and an associated sign bit S. As such, the immediate value field 234 may comprise values in the range from −127 to +128. The operand field 232 is used to store the identity of one of the registers 140. Because there are 16 registers, the operand field 232 includes four bits so that all 16 registers can be used in the instructions of FIGS. 5A-E.

Figure 5A:
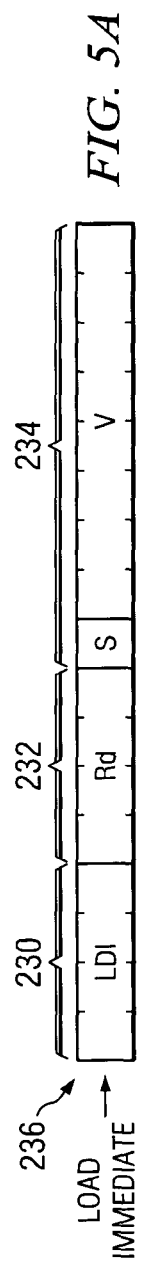
Figure 5B:
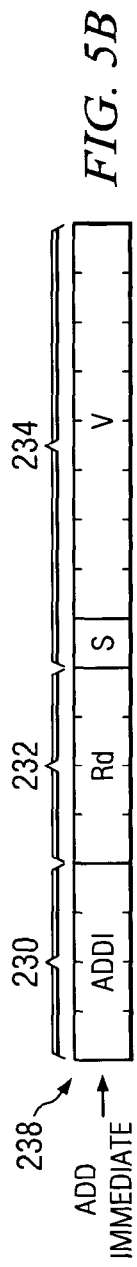

The "load immediate" instruction 236 shown in FIG. 5A causes the immediate value from field 234 to be loaded into the destination register "$R_d$" specified in field 232. The "add immediate" instruction 238 shown in FIG. 5B causes the immediate value in field 234 to be added to the contents of the destination register "$R_d$" field 232 and the result stored back in $R_d$.

Figure 5C:
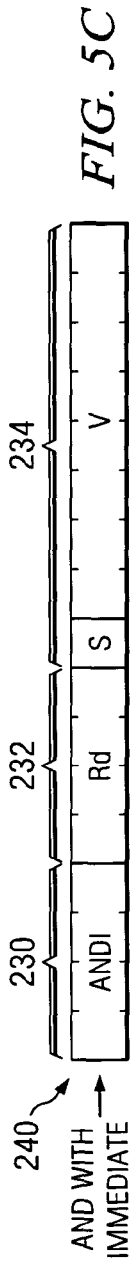
Figure 5D:
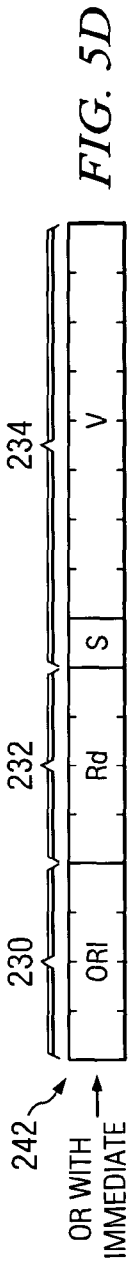

In FIG. 5C, the "AND with immediate" instruction 240 causes the immediate value in field 234 to be logically AND'd with the value held within the destination register $R_d$. The result is stored back in $R_d$. The "OR with immediate" instruction 242 in FIG. 5D causes the immediate value in field 234 to be logically OR'd with the value held within the destination register $R_d$ corresponding to field 232 and the result stored back in $R_d$.

Figure 5E:
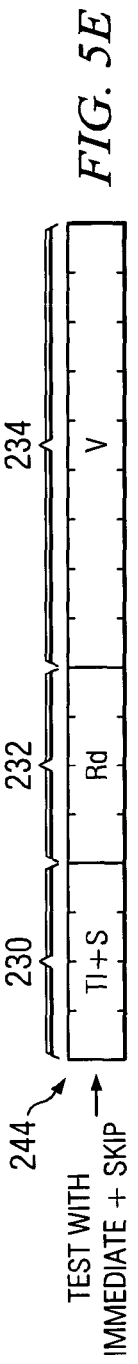

The "test with immediate and skip" instruction 244 in FIG. 5E causes the immediate value in field 234 to be compared to the contents of the destination register $R_d$ and a bit in the status register R15 to be written as a 0 or 1 to reflect the result of the comparison. If the immediate value does not match the contents of $R_d$ then the instruction (not specifically shown in FIG. 5E) following the "test with immediate and skip" instruction is skipped during execution, for example, by changing the next instruction into a no operation instruction ("NOP"). If, however, the immediate value does match the contents of the target memory location, then the subsequent instruction is not skipped.

Figure 5F:
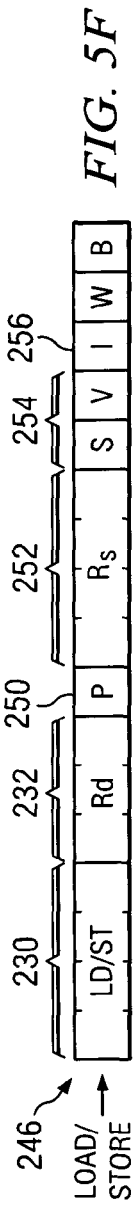

FIG. 5F shows a preferred format for a 16-bit load or store instruction 246 in which the value being loaded or stored is not expressly included in the instruction itself, as was the case with the load immediate instruction 236 described above in FIG. 5A. In FIG. 5F, the opcode field encodes either a load opcode or a store opcode. A plurality of addressing modes are possible with the exemplary format of FIG. 5F and, in accordance with the preferred embodiments of the present invention, four addressing modes are possible. Bits P 250 and I 256 may encode any one of the four addressing modes to be used in a particular instance of load/store instruction 246. In each addressing mode, two locations are used—data is retrieved from one location and stored at another. In the context of a load instruction, data is read from a "source" address in memory and loaded into a "target" register. For a store instruction, data is read from a target register "Rd" which is included in field 232 and stored in memory at a source address in accordance with any of a plurality of addressing modes as explained below. The Rd field 232 includes three bits in the embodiment of FIG. 5F, and thus encodes one of eight registers (preferably registers R0-R7).

The following discussion described four addressing modes for computing the source address in accordance with the preferred embodiments of the invention. If the P bit 250 is a 0 and the I bit 256 is a 0, the source address preferably is computed by adding together a base address and an immediate value. The base address is stored in a register which is specified by the $R_s$ field 252. The immediate value is specified in the immediate field 254 which comprises a sign bit S and an immediate bit V. As such, the immediate field 254 may include an immediate value including—1, 0, 1, and 2. Like the $R_d$ field 232, the $R_s$ field 252 may include three bits and as such, may encode one of eight registers, preferably R0-R7.

If the P bit 250 is a 0 and the I bit 256 is a 1, the source memory address is the base address specified by the $R_s$ register in field 252. Once the base address is used to determine the memory reference, the $R_s$ register value in field 252 is recomputed by adding the current $R_s$ register value by the amount of the immediate field 254 and storing the result back in the $R_s$ field 252 (i.e., a post increment by an amount V).

If the P bit 250 is a 1 and the I bit 256 is a 0, the source memory address preferably is computed by adding together the memory address contained in the $R_s$ register (field 252) and the memory address contained in a predetermined index register (e.g., register R8). Once the source address is computed, the value in the predetermined index register may be incremented by the amount of the immediate field 254, an amount which may range from −1 to +2 as explained above.

If the P bit 250 is a 1 and the I bit 256 is a 1, the source memory address preferably is computed by adding together the memory address contained in the $R_s$ register identified in field 252 and the memory address contained in the predetermined index register R8. The sum of those two memory addresses represents the source address for the load or store instruction.

As explained above, the $R_d$ register represents the target register for the data transfer. That register may include any register R0-R7. The R7 register is the top of the stack register. If the $R_d$ register in the load/store instruction 246 is the R7 register, then the R6 register, which includes the stack pointer (SP), preferably is updated accordingly to reflect a change in the status of the micro-stack 146 and the value from the top of the stack (R7) that is used is consumed (i.e., removed). The inclusion of register R7 storing the top of the stack permits an efficient and powerful mechanism for transferring blocks of data to/from memory from/to the stack with a single instruction with a repeat loop. The AGUs 142 may also be used in this context to calculate memory source and destination addresses for such data transfers.

Figure 5G:
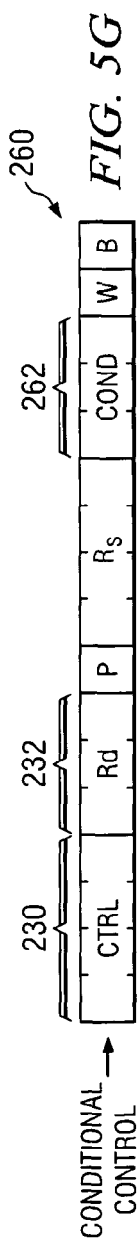

Turning now to FIG. 5G, a conditional control instruction 260 is shown which preferably causes the value held in $R_d$ (field 232) to be compared with the value located in memory (addressing mode already described). The comparison may determine whether the $R_d$ value is not equal, equal, greater than, greater than or equal, smaller than, or smaller than or equal to the value located in memory. Other comparison conditions may also be defined as desired. The type of comparison being made is encoded in the COND field 262 which may comprise three bits as shown. In this instruction, when $R_d$ is equal to $R_7$, the stack pointer in register $R_6$ is updated accordingly when, for example, a value is consumed from the stack.

Figure 5H:
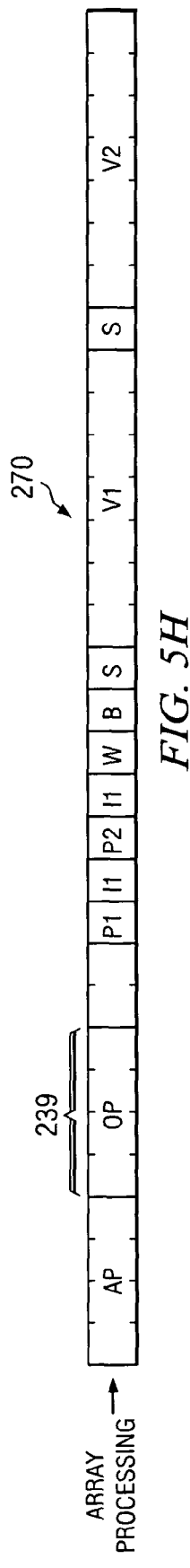

FIGS. 5H-L show various 32-bit C-ISA instructions. Turning to FIG. 5H, an array processing instruction takes a first operand array from memory located at an address present in an implicit register (e.g., register R0) and a second operand array from memory located at an address present in another implicit register (e.g., R1) with all possible addressing modes defined above and performs the operation defined by the opcode field 239. Without limitation, the operation may include operations such as add, subtract, AND, OR, etc. Register R8 and immediate value V1 are associated with the operand of a first array, while register R9 and the immediate value V2 are associated with the operand of a second array. The result of the operation preferably is pushed onto the stack and thus the use of register R7 is implicit in the instruction and thus register R6 is updated by each of these instructions.

Figure 5I:
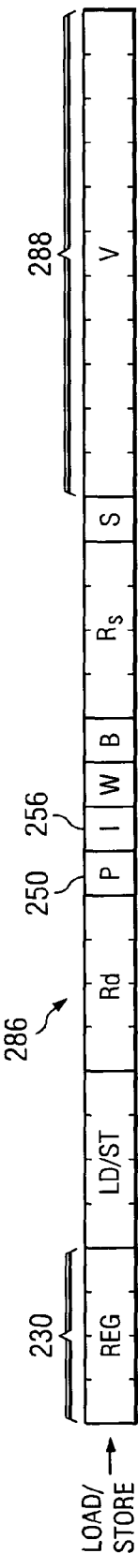

In FIG. 5I, a 32-bit load/store instruction 286 is shown in which data is loaded in register Rd if a load is specified in field 230. If a store is specified, the data to be stored is specified in Rd. Four different addressing modes can be implemented in instruction 286 as described above via the encoding of the P and I bits 250, 256. If Rd or Rs is equal to R7, then the stack pointer register R6 is updated accordingly as explained previously. The 32-bit load/store instruction 286 is generally similar to its 16-bit counterpart instruction 246 in FIG. 5F, but the immediate field 288 in instruction 286 is wider (12 bits including sign bit S) than in instruction 246, permitting increased code density.

Figure 5J:
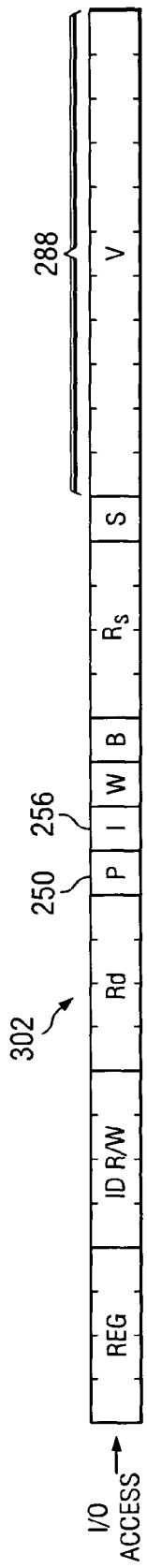

Turning now to FIG. 5J, an I/O access instruction 302 is shown which preferably loads or stores data between the I/O space and the JSM register set 140. The $R_d$ register generally is used to receive data in an I/O read and as a source register in the event of an I/O write. As before, multiple addressing schemes may be specified by the P and I bits 250, 256. As before, register R6 is updated accordingly if Rd or Rs equals R7.

Turning now to FIG. 5K, a register shift instruction 318 permits the data in $R_d$ to be shifted left or right. The D bit 320 encodes the direction of the shift (left or right). The Ir bit 322 specifies whether the shift value comes from an immediate value V 324 or from Rs 326. If $R_d$ equals R7, then top of stack pointer R6 is updated as before. The T bit indicates the type of shift operation (e.g., arithmetic or logical).

Turning now to FIG. 5L, a register arithmetic instruction 334 preferably takes two operands from $R_{s1}$ and $R_{s2}$, performs an operation (e.g., add, subtract, AND, OR, XOR, etc.) defined by the opcode field on these values, and stores the result into $R_d$. Register R6 is updated in the event R7 is loaded into $R_d$ or either of $R_{s1}$ or $R_{s2}$ is equal to R7.

As noted previously, system 100 may be implemented as a mobile cell phone such as that shown in FIG. 6. As shown, a mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor, comprising:
   a core;
   a multi-entry stack contained in said core and usable in at least a stack-based instruction set and comprising a plurality of entries, all of said entries of said multi-entry stack correspond to a subset of entries at the top of a main stack implemented in memory outside said core;
   logic contained in said core and coupled to said stack, the logic manages the stack; and
   a plurality of registers contained in said core and coupled to the logic and addressable through a second instruction set that provides register-based and memory-based operations;
   wherein said logic executes instructions from both said stack-based instruction set and said second instruction set; and
   an instruction fetch logic contained in said core, said instruction fetch logic receives at least stack-based instructions from the stack-based instruction set.

2. The processor of claim 1 wherein the multi-entry stack has a top and the stack is accessible within the second instruction set through at least one of the registers in which a value is stored that is present at the top of the multi-entry stack.

3. The processor of claim 1 wherein the multi-entry stack has a top that is addressable by a memory mapped address, and the memory mapped address is stored in a register which is accessed by the second instruction set.

4. The processor of claim 1 wherein the stack-based instruction set accesses operands from the multi-entry stack and places results from operations on the multi-entry stack and, as a result of accessing operands from the multi-entry stack and placing results on the multi-entry stack, at least some of the registers are updated.

5. The processor of claim 1 further comprising a first program counter usable in the execution of the stack-based instruction set and a second program counter usable in the execution of a micro-sequence that comprises instructions from both the stack-based and second instruction sets.

6. The processor of claim 1 further comprising a pair of parallel address generation units coupled to said logic which are used to compute memory source and destination addresses and wherein a register includes the top of the multi-entry stack, thereby permitting a block of data to be moved between a memory area and the multi-entry stack by execution of a single instruction with a repeat loop.

7. The processor of claim 1 wherein the second instruction set comprises an instruction that retrieves operands from memory, performs a computation on the operands, and places the result on the stack.

8. A method of processing instructions in a processor, comprising:
   fetch logic in a core of the processor receiving instructions from a first instruction set which comprises stack-based instructions;
   said fetch logic receiving instructions from a second instruction set which comprises memory-based and register-based instructions; and
   executing said received instructions from the first and second instruction sets in said core.

9. The method of claim 8 further comprising forming a sequence of instructions from both of said first and second instruction sets.

10. The method of claim 8 further comprising executing an instruction from said second instruction set that targets a stack included in said core, said stack having a top, and storing a value at the top of the stack in a register in the processor.

11. The method of claim 10 further comprising updating an address stored in another register that points to the top of the stack.

12. A processor, comprising:
a core;
a multi-entry stack contained in said core and having a top and usable in at least a stack-based instruction set;
logic contained in said core and coupled to said stack, the logic manages the stack;
memory coupled to said logic and located outside said core; and
a plurality of registers contained in said core and coupled to the logic and addressable through a second instruction set that provides register-based and memory-based operations;
wherein a first register includes an address through which the top of the stack is accessed and a second register in which a value at the top of the stack is stored;
wherein said multi-entry stack comprises a plurality of entries, all of said entries of said multi-entry stack correspond to a subset of entries of a main stack implemented in said memory;
wherein said logic executes instructions from both said stack-based instruction set and said second instruction set; and
wherein at least one of the registers are used to calculate addresses in parallel, said addresses being calculated in accordance with any of a plurality of addressing modes specified by the second instruction set.

13. The processor of claim 12 wherein the stack-based instruction set accesses operands from the multi-entry stack and places results from operations on the multi-entry stack and, as a result of accessing operands from the multi-entry stack and placing results on the multi-entry stack thereby causing the address in the first register to be changed.

14. The processor of claim 13 wherein the address in the first register is incremented or decremented depending on whether the register is used as a source or a destination, respectively, for an operation.

15. The processor of claim 12 wherein the stack-based instruction set comprises Java Bytecodes.

16. The processor of claim 12 further comprising a first program counter usable in the execution of the first instruction set and a second program counter usable in the execution of code that comprises instructions from both the first and second instruction sets.

17. The processor of claim 12 wherein at least one of the registers includes an offset usable in the calculation of addresses.

18. The processor of claim 12 wherein the second instruction set comprises an instruction that moves data from a register or memory to a register, and consequently to the multi-entry stack.

19. The processor of claim 18 wherein the instruction that moves data includes a plurality of bits of that encode one of a plurality of addressing modes.

20. The processor of claim 19 wherein the addressing modes include a mode in which the instruction that moves data includes an immediate value and a reference to a register containing a base address, wherein the immediate value and the base address are added together to generate a source memory address for the move instruction.

21. The processor of claim 19 wherein the addressing modes include a mode in which the instruction that moves data includes a reference to register in which a source memory address is stored to be used in the move instruction, and the source memory address in the referenced register is incremented by an immediate value also included in the move instruction.

22. The processor of claim 19 wherein the addressing modes include a mode in which the instruction that moves data includes references to two registers in which memory addresses are stored, one register being a predetermined index register, the memory addresses from the two registers are added together to calculate a source memory address used to complete the move instruction, and the address in the predetermined index register is incremented.

23. The processor of claim 19 wherein the addressing modes include a mode in which the instruction that moves data includes references to two registers in which memory addresses are stored, the memory addresses are added together to calculate the memory address used to complete the move instruction.

24. The processor of claim 12 wherein the processor is configured to be coupled to a separate processor on which an operating system is executed.

25. The processor of claim 12 further comprising a first program counter usable in the execution of the stack-based instruction set and a second program counter usable in the execution of a micro-sequence that comprises instructions from both the stack-based and second instruction sets.

26. The processor of claim 12 further comprising a pair of parallel address generation units coupled to said logic which are used to compute memory source and destination addresses and wherein a register includes the top of the multi-entry stack, thereby permitting a block of data to be moved between a memory area and the multi-entry stack by execution of a single instruction with a repeat loop.

27. A system, comprising:
a main processor unit;
a co-processor having a core that comprises a hardware stack, fetch logic, and registers, said co-processor is coupled to the main processor unit, said fetch logic receiving stack-based instructions from a first instruction set, and the core of the co-processor is configured to execute the stack-based instructions and instructions from a second instruction set that provides memory-based and register-based operations;
wherein said hardware stack comprises a subset of entries at a top of a memory-based stack implemented in memory outside said core.

28. The system of claim 27 wherein the stack-based instructions comprise Java bytecodes.

29. The system of claim 28 further including a compiler coupled to said co-processor, said compiler receives Java bytecodes and replaces at least one group of bytecodes by a sequence of instructions from the second instruction set and provides said sequence to the co-processor for execution.

30. The system of claim 29 wherein the sequence also includes stack-based instructions from the first instruction set.

31. The system of claim 27 wherein the system comprises a cellular telephone.

32. The system of claim 27 wherein the hardware stack has a top and is accessible within the second instruction set through at least one of the registers in which a value is stored that is present at the top of the hardware stack.

33. The system of claim 27 wherein the top of the hardware stack is addressable by a memory mapped address, and the memory mapped address is stored in a register which is accessed by the second instruction set.

34. The system of claim 27 wherein the stack-based instruction set accesses operands from the hardware stack and places results from operations on the hardware stack and, as a result of accessing operands from the hardware stack and placing results on the hardware stack, at least some of the registers are updated.

35. The system of claim 27 further comprising a first program counter usable in the execution of the stack-based instruction set and a second program counter usable in the execution of a micro-sequence that comprises instructions from both the stack-based and second instruction sets.

36. The system of claim 35 wherein the first and second program counters are stored in said registers.

37. The system of claim 27 wherein the co-processor further comprises a first program counter usable in the execution of the first instruction set and a second program counter usable in the execution of a micro-sequence that comprises instructions from both the first and second instruction sets.

38. The system of claim 27 further comprising a memory area and wherein the co-processor further comprises a pair of parallel address generation units coupled to said logic which are used to compute memory source and destination addresses and wherein a register includes the top of the hardware stack, thereby permitting a block of data to be moved between a memory area and the stack by execution of a single instruction with a repeat loop.

* * * * *